US006952665B1

(12) United States Patent

Shimomura et al.

(10) Patent No.: US 6,952,665 B1

(45) Date of Patent: Oct. 4, 2005

(54) TRANSLATING APPARATUS AND METHOD, AND RECORDING MEDIUM USED THEREWITH

(75) Inventors: Hideki Shimomura, Kanagawa (JP); Kazuhiko Tajima, Tokyo (JP); Seiichi Aoyagi, Chiba (JP); Hiroaki Ogawa, Chiba (JP)

(73) Assignee: Sony Corporation, Tokyo (JP)

( * ) Notice: Subject to any disclaimer, the term of this patent is extended or adjusted under 35 U.S.C. 154(b) by 555 days.

(21) Appl. No.: 09/676,126

(22) Filed: Sep. 29, 2000

(30) Foreign Application Priority Data

Sep. 30, 1999 (JP) ................................ 11-277743

(51) Int. Cl.[7] ............................................... G08F 17/28

(52) U.S. Cl. ....................... 704/2; 704/3; 704/8; 704/9; 704/235; 704/277; 704/10; 715/536; 715/531; 717/137

(58) Field of Search ............................... 704/2, 3, 8, 9, 704/235, 251, 277, 270.1, 10, 7, 256, 260; 715/536, 531; 717/137

(56) References Cited

U.S. PATENT DOCUMENTS

| | | | | |
|---|---|---|---|---|
| 4,791,587 | A * | 12/1988 | Doi | 704/2 |
| 4,800,522 | A * | 1/1989 | Miyao et al. | 704/2 |
| 4,864,503 | A * | 9/1989 | Tolin | 704/2 |
| 5,384,701 | A * | 1/1995 | Stentiford et al. | 704/3 |
| 5,568,383 | A * | 10/1996 | Johnson et al. | 704/2 |
| 5,974,371 | A * | 10/1999 | Hirai et al. | 704/2 |
| 6,092,036 | A * | 7/2000 | Hamann | 704/8 |
| 6,161,082 | A * | 12/2000 | Goldberg et al. | 704/3 |
| 6,175,819 | B1 * | 1/2001 | Van Alstine | 704/235 |
| 6,219,646 | B1 * | 4/2001 | Cherny | 704/277 |
| 6,393,388 | B1 * | 5/2002 | Franz et al. | 704/4 |

FOREIGN PATENT DOCUMENTS

| | | |
|---|---|---|
| EP | 0 335 710 | 8/1997 |
| WO | WO 97 43707 | 11/1997 |

OTHER PUBLICATIONS

Waibel A: "Interactive Translation of Conversational Speech" Computer, IEEE Computer Society, Long Beach., CA, US, vol. 29, No. 7, Jul. 1, 1996, pp. 41-48, XP000621882 ISSN: 0018-9162.

* cited by examiner

*Primary Examiner*—Vijay Chawan

(74) *Attorney, Agent, or Firm*—Frommer Lawrence & Haug LLP; William S. Frommer

(57) ABSTRACT

A translating apparatus includes a speech recognition unit, a machine translation unit, a speech synthesizing unit, and a dialog management unit. The speech recognition unit recognizes input speech, and supplies the result of the speech recognition to the machine translation unit. The machine translation unit translates the result of the speech recognition. When a Japanese-speaking user and an English-speaking user speak to each other, the dialog management unit stores a history of dialogs, and determines based on the dialog history and prestored knowledge whether the result of the translation by the machine translation unit is unnatural compared with the flow of the dialog. When the result of the translation is unnatural, the dialog management unit outputs, to the machine translation unit, information representing the unnatural result. This controls the machine translation unit to perform translation again.

8 Claims, 12 Drawing Sheets

TRANSLATING APPARATUS AND METHOD, AND RECORDING MEDIUM USED THEREWITH

BACKGROUND OF THE INVENTION

1. Field of the Invention

The present invention relates to translating apparatuses and methods, and to recording media used therewith. In particular, the present invention relates to a translating apparatus and a translating method which enable, for example, a smooth conversation between two users speaking in different languages, and to a recording medium used with the apparatus and the method.

2. Description of the Related Art

A speech translation system is known as a tool for enabling communication between users speaking in different languages such as Japanese and English. In this speech translation system, speech in Japanese is recognized, and the result of the speech recognition is translated into English and is output as synthesized speech, and speech in English is recognized, and the result of the speech recognition is translated into Japanese and is output as synthesized speech. Accordingly, the English-speaking user can hear in English speech from the Japanese-speaking user, while the Japanese speaking user can hear in Japanese speech from the English-speaking user, whereby both users can have a conversation and understand each other.

The above-described speech translation system cannot always perform accurate translation. When accurate translation is not performed, it may be difficult for both users to have a smooth conversation.

SUMMARY OF THE INVENTION

Accordingly, it is an object of the present invention to provide a translating apparatus and method for enabling users who speak different languages to have a smooth conversation by performing more accurate translation, and a recording medium used with the translating apparatus and method.

To this end, according to an aspect of the present invention, the foregoing object is achieved through provision of a translating apparatus including a translator unit for translating a first language into a second language and for translating the second language into the first language, a history storage unit for storing a history of conversations in the first and second languages; a knowledge storage unit for storing predetermined knowledge, and a processor unit for performing predetermined processing.

According to another aspect of the present invention, the foregoing object is achieved through provision of a translating method for translating a text input in a first language and outputting a text translated in a second language and for translating a text input in the second language and outputting a text translated in the first language. The translating method includes the steps of translating the first language into the second language and for translating the second language into the first language, storing a history of dialogs held in the first language and the second language, and performing predetermined processing based on the dialog history and predetermined knowledge.

According to a further aspect of the present invention, the foregoing object is achieved through provision of a computer-readable recording medium containing a program for controlling a computer to execute a translation process for translating a text input in a first language and outputting a text translated in a second language and for translating a text input in the second language and outputting a text translated in the first language. The program includes the steps of translating the first language into the second language and for translating the second language into the first language, storing a history of dialogs held in the first language and the second language, and performing predetermined processing based on the dialog history and predetermined knowledge.

DESCRIPTION OF THE PREFERRED EMBODIMENTS

Figure 1:
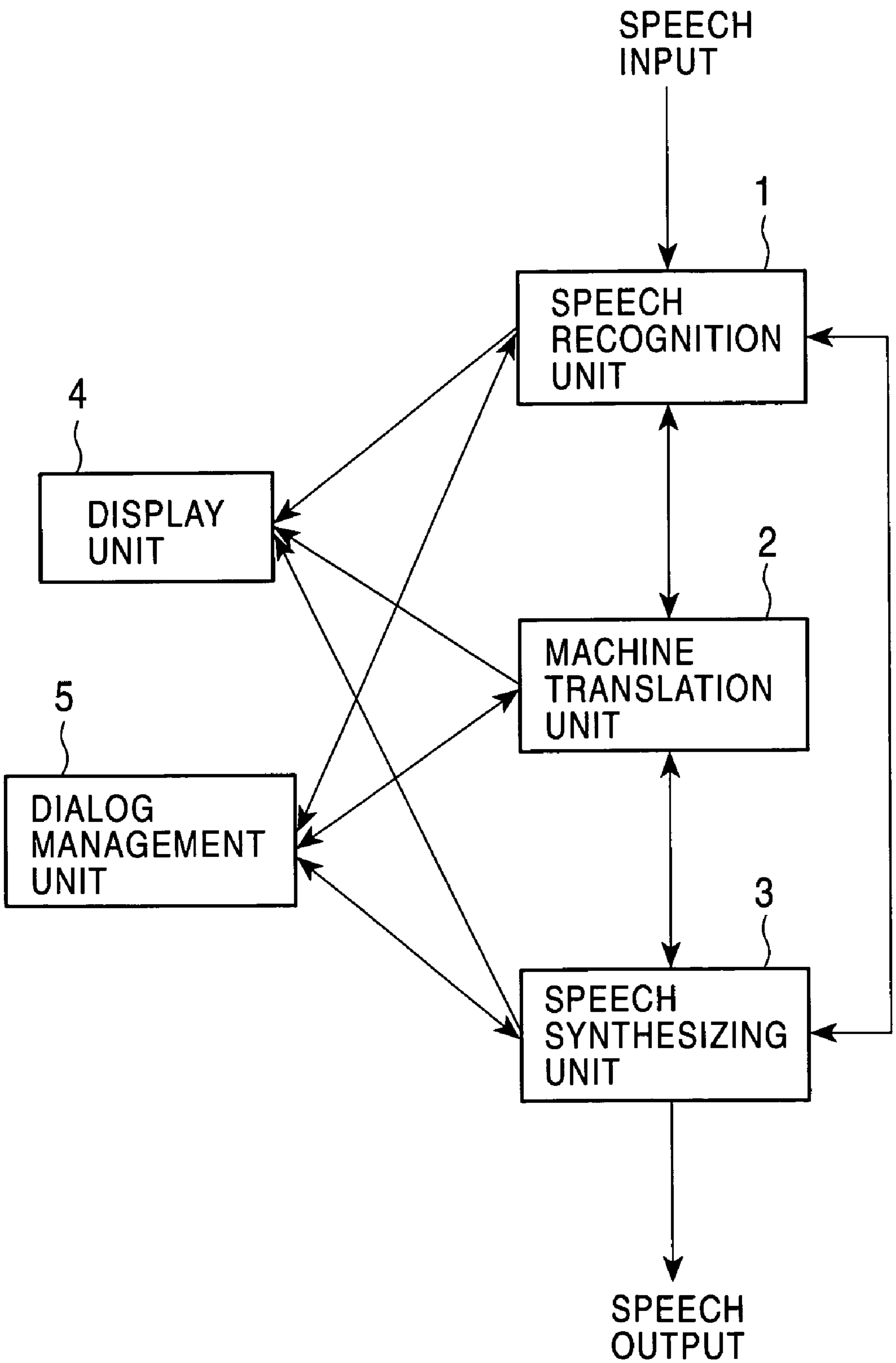
FIG. 1 is a block diagram showing an embodiment of the present invention in which the present invention is applied to a speech translation system.

FIG. 1 shows an embodiment of the present invention in which the present invention is applied to a speech translation system ("system" means a physical collection of a plurality of component units, and it does not matter if each unit is provided in the same housing).

By way of example, when speech in Japanese is input to the speech translation system, an English translation from the speech is output, and when speech in English is input to the speech translation system, a Japanese translation from the speech is output. This enables a Japanese-speaking user and an English-speaking user to have a conversation with each other.

Speech from each user is input to a speech recognition unit 1. The speech recognition unit 1 recognizes the input speech, and outputs text and other accompanying information as the result of the speech recognition to a machine translation unit 2, a display unit 4, a dialog management unit 5, etc., as required.

The machine translation unit 2 analyzes the speech recognition result output from the speech recognition unit 1, performs machine translation of the input speech into a language different from the language of the input speech (in this embodiment, Japanese is translated into English and English is translated into Japanese), and outputs text and other accompanying information as the result of the machine translation to a speech synthesizing unit 3, the display unit 4, the dialog management unit 5, etc., as required. The speech synthesizing unit 3 performs a speech-synthesizing process based on outputs from the machine translation unit 2, the dialog management unit 5, etc., and outputs the result of translation of the input speech, for example, synthesized speech, into a language different from the language of the input speech.

The display unit 4 is formed by, for example, a liquid crystal display, and displays the result of the speech recognition by the speech recognition unit 1, the result of the machine translation by the machine translation unit 2, and information output by the dialog management unit 5, as required.

The dialog management unit 5 understands the contents of speech from each user from the outputs from the speech recognition unit 1 and the machine translation unit 2, and manages, based on the result of the understanding, a history of dialogs between the users. The dialog management unit 5 also has, for example, knowledge about the Japanese language and the English language, and performs various processes based on the knowledge and the dialog history, such as feedback of information for assisting speech recognition and machine translation to the speech recognition unit 1 and the machine translation unit 2. Required text is generated and is output to the speech synthesizing unit 3 and the display unit 4 by the dialog management unit 5, as required.

According to the above-described speech translation system, when speech in, for example, Japanese is input to the system, the speech recognition unit 1 recognizes the input speech and supplies the recognized speech to the machine translation unit 2. The machine translation unit 2 performs machine translation of the result of the speech recognition by the speech recognition unit 1 into English and supplies the translation to the speech synthesizing unit 3 and the dialog management unit 5. Synthesized speech corresponding to the result of the speech recognition is generated and output by the speech synthesizing unit 3. Also, when speech in English is input to the system, the speech recognition unit 1 recognizes the input speech and supplies the recognized speech to the machine translation unit 2. The machine translation unit 2 performs machine translation of the result of the speech recognition from the speech recognition unit 1 into Japanese and supplies the translation to the speech synthesizing unit 3 and the dialog management unit 5. Synthesized speech corresponding to the result of the speech recognition is generated and output by the speech synthesizing unit 3.

Accordingly, the speech translation system shown in FIG. 1 enables the English-speaking user to understand speech in Japanese from the Japanese-speaking user, and enables the Japanese-speaking user to understand speech in English from the English-speaking user. This enables a dialog between the Japanese-speaking user and the English-speaking user.

When the Japanese-speaking user and the English-speaking user have a conversation, the dialog management unit 5 generates, based on the result of the translation obtained by the machine translation unit 2, a history of dialogs between the Japanese-speaking user and the English-speaking user, and performs various processes for enabling a smooth conversation based on the dialog history and knowledge stored beforehand.

Figure 2:
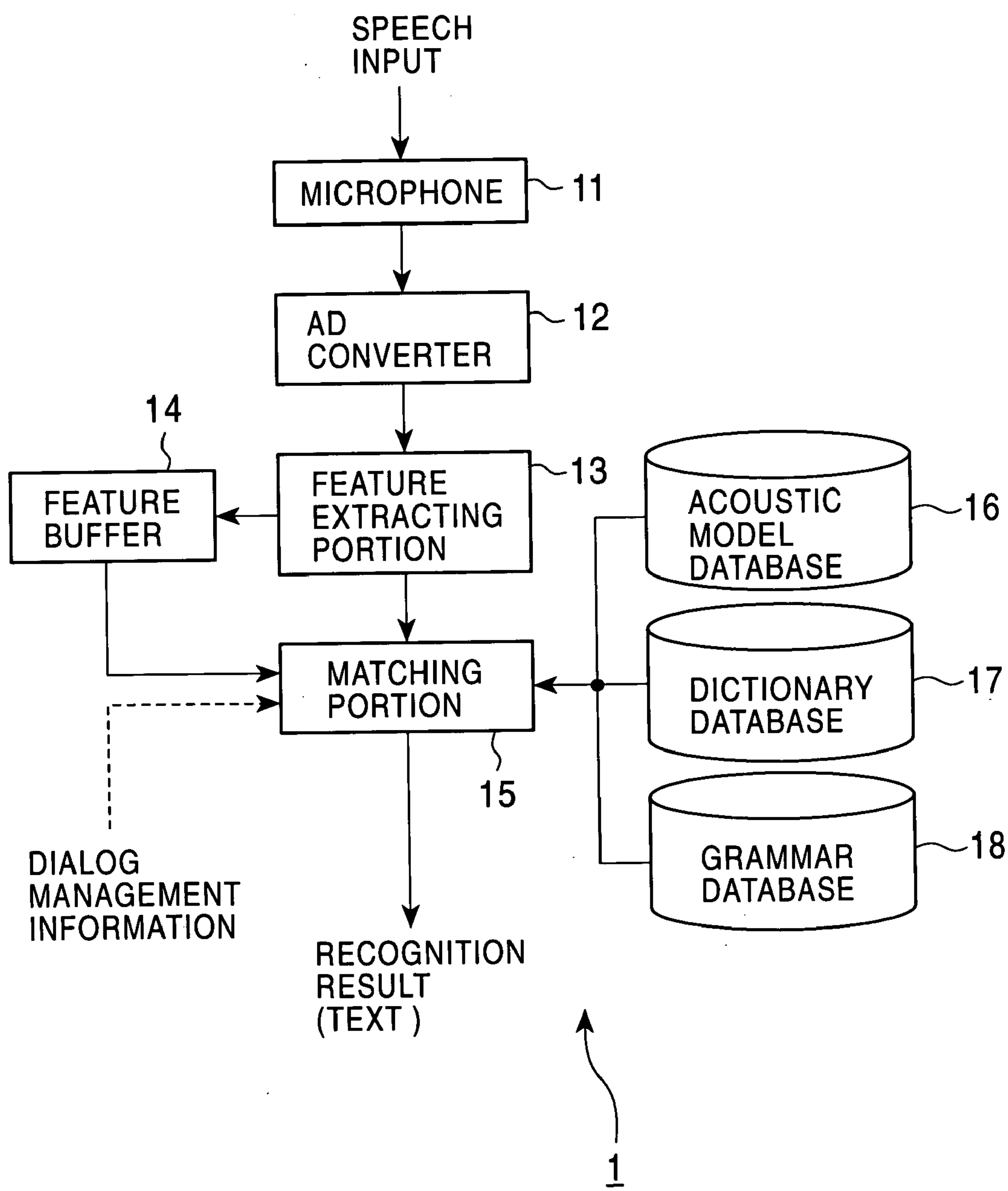
FIG. 2 is a block diagram showing an example of the speech recognition unit 1 shown in FIG. 1.

Referring to FIG. 2, the structure of the speech recognition unit 1 shown in FIG. 1 is shown.

Speech from a user is input to a microphone 11, where the speech is converted into a speech signal as an electric signal. The speech signal is supplied to an analog-to-digital (AD) converter 12. In the A/D converter 12, the speech signal from the microphone 11, which is an analog signal, is sampled, quantized, and converted into speech data as a digital signal. The speech data is supplied to a feature extraction portion 13.

The feature extraction portion 13 extracts, for each appropriate number of frames, feature parameters, such as a spectrum, a linear predictive coefficient, a cepstrum coefficient, and a line spectrum logarithm, from the speech data from the A/D converter 12, and supplies the extracted feature parameters to a feature buffer 14 and a matching portion 15. The feature buffer 14 temporarily stores the feature parameters from the feature extraction portion 13.

The matching portion 15 recognizes, based on the feature parameters from the feature extraction portion 13 or the feature parameters stored in the feature buffer 14, the speech input to the microphone 11 (input speech) by referring to an acoustic model database 16, a dictionary database 17, and a grammar database 18, as required.

The acoustic model database 16 contains acoustic models representing acoustic features such as phonemes and syllables in each language corresponding to the speech to be recognized. As one of the acoustic models, for example, the Hidden Markov Model (HMM) can be used. The dictionary database 17 contains a word dictionary describing information on the pronunciation of each word to be recognized. The grammar database 18 contains grammar rules describing how words registered in the word dictionary of the dictionary database 17 are catenated (combined) with one another. As the grammar rules, rules based on a context free grammar, a statistical probability of word concatenation, etc., can be used.

The matching portion 15 connects some of the acoustic models stored in the acoustic model database 16 by referring to the word dictionary of the dictionary database 17, thereby forming an acoustic model (word model) of each word. The matching portion 15 connects several word models by referring to the grammar rules stored in the grammar database 18, and uses the thus connected word models to recognize the speech input to the microphone 11 based on the feature parameters by, for example, the HMM.

The result of the speech recognition by the matching portion 15 is output, for example, in text.

The matching portion 15 can receive information (hereinafter referred to as "dialog management information") obtained by the dialog management unit 5, and can perform precise speech recognition based on the dialog management information.

When the matching portion 15 must process the input speech again, it uses the feature parameters stored in the feature buffer 14. This eliminates the need for requesting each user to speak again.

Figure 3:
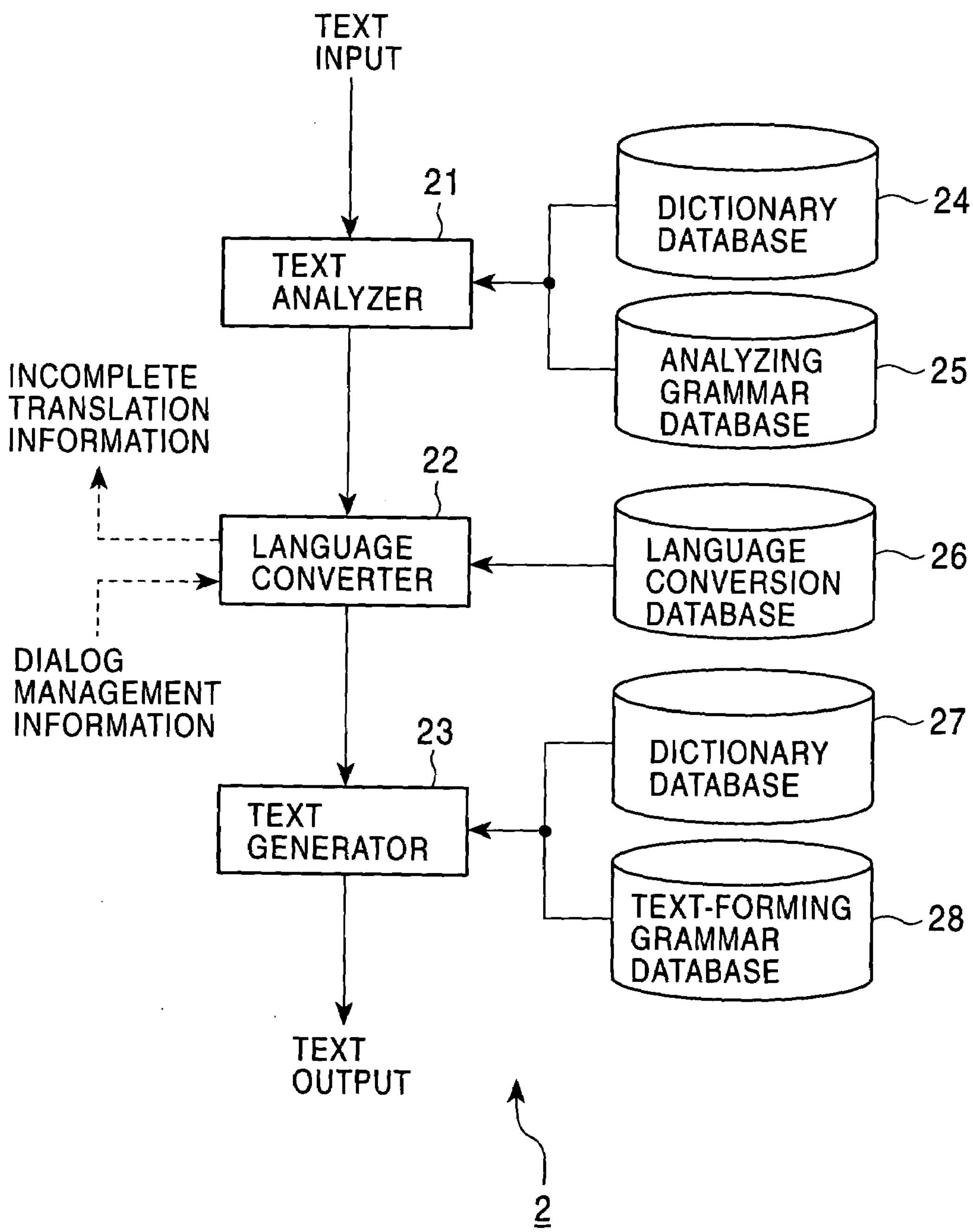
FIG. 3 is a block diagram showing an example of the machine translation unit 2 shown in FIG. 1.

Referring to FIG. 3, the structure of the machine translation unit 2 is shown.

A text or the like, which is the result of the speech recognition output from the speech recognition unit 1, is input to a text analyzer 21. The text analyzer 21 analyzes the input text by referring to a dictionary database 24 and an analyzing grammar database 25.

The dictionary database 24 contains a word dictionary describing the representation of each word, word class information required for applying an analyzing grammar, etc. The analyzing grammar database 25 contains analyzing grammar rules describing restrictions on word concatenation based on information on words described in the word dictionary. Based on the word dictionary and the analyzing grammar rules, the text analyzer 21 performs analyses of the input text, such as a morphemic analysis and a syntactic analysis, and extracts language information such as information on words and sentence structures constituting the input text. Analyzing methods for use in the text analyzer 21 include, for example, a regular grammar, a context free grammar, and a grammar using a statistical probability of word concatenation.

The language information as the result of the analyses of the input text, obtained by the text analyzer 21, is supplied to a language converter 22. The language converter 22 converts language information on the language of the input text into language information on the language of the result of translation by referring to a language conversion database 26.

The language conversion database 26 contains language conversion data such as conversion patterns (templates) from language information on an input language (the language of an input to the language converter 22) into language information on an output language (the language of an output from the language converter 22), contrastive examples between the input language and the output language, and a thesaurus used for calculating resemblance between the contrastive examples and the input language. The language converter 22 converts, based on the language conversion data, the language information on the language of the input text into language information on the output language.

The language information on the output language, obtained by the language converter 22, is supplied to a text generator 23. The text generator 23 generates a text as a translation from the input text by referring to a dictionary database 27 and a text-forming grammar database 28.

The dictionary database 27 contains a word dictionary describing information such as word classes and conjugations of words required for generating a sentence in the output language. The text-forming grammar database 28 contains text-forming grammar rules such as conjugation rules and word-order limitations for words required for generating a sentence in the output language. The text generator 23 converts, based on the word dictionary and the text-forming grammar rules, the language information from the language converter 22 into a text, and outputs the text.

When it is difficult for the language converter 22 to convert (translate) the language information on the language of the input text into the language information on the output language by using only information included in the outputs from the text analyzer 21, the language converter 22 can output, to the dialog management unit 5, incomplete translation information representing lack of information required for translation. This enables translation by obtaining the lack of information.

The language converter 22 can receive dialog management information from the dialog management unit 5, and can precise translation based on the dialog management information.

Figure 4:
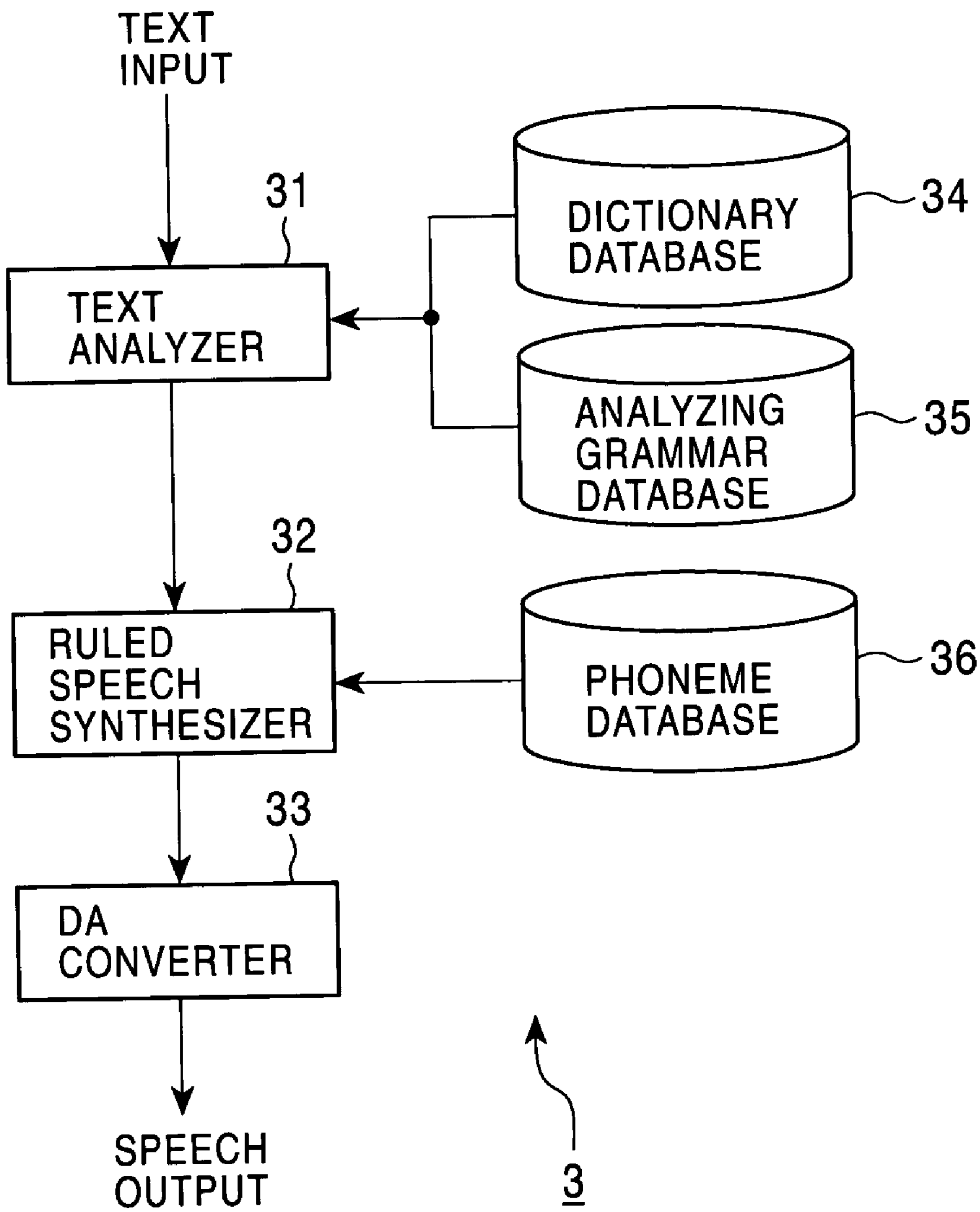
FIG. 4 is a block diagram showing an example of the speech synthesizing unit 3 shown in FIG. 1.

Referring to FIG. 4, the structure of the speech synthesizing unit 3 is shown.

The text as a translation output by the machine translation unit 2, or the text output by the dialog management unit 5, is input as a thing to be processed by speech synthesization to a text analyzer 31. The text analyzer 31 analyzes the input text by referring to a dictionary database 34 and an analyzing grammar database 35.

The dictionary database 34 contains a word dictionary describing information on classes, pronunciations, and accents of words. The analyzing grammar database 35 contains analyzing grammar rules such as restrictions on word concatenation about the words described in the word dictionary. The text analyzer 31 performs, based on the word dictionary and the analyzing grammar rules, analyses of the input text, such as a morphemic analysis and a syntactic analysis, and extracts information required for ruled synthesization of speech by a rule synthesizer 32 at the subsequent stage. The information required for ruled synthesization of speech includes, for example, information for controlling the positions of pauses, accents, and intonations, other prosodic information, and phonemic information such as the pronunciations of words.

The information obtained by the text analyzer 31 is supplied to the ruled speech synthesizer 32. The ruled speech synthesizer 32 uses a phoneme database 36 to generate synthesized speech data (digital data) corresponding to the text input to the text analyzer 31.

The phoneme database 36 contains, for example, phoneme-element data in forms representing a combination of a constant and a vowel (indicated by "CV"), a combination of a vowel, a constant, and a vowel (indicated by "VCV"), a combination of a constant, a vowel, and a constant (indicated by "CVC"), etc. The ruled speech synthesizer 32 connects, based on the information from the text analyzer 31, required phoneme-element data, and appropriately adds pauses, accents, and intonations to the connected phoneme-element data, whereby synthesized speech data corresponding to the text input to the text analyzer 31 is generated.

The generated speech data is supplied to the D/A converter 33, where it is converted into a speech signal as an analog signal. The speech signal is supplied to a speaker (not shown), from which the synthesized speech corresponding to the text input to the text analyzer 31 is output.

Figure 5:
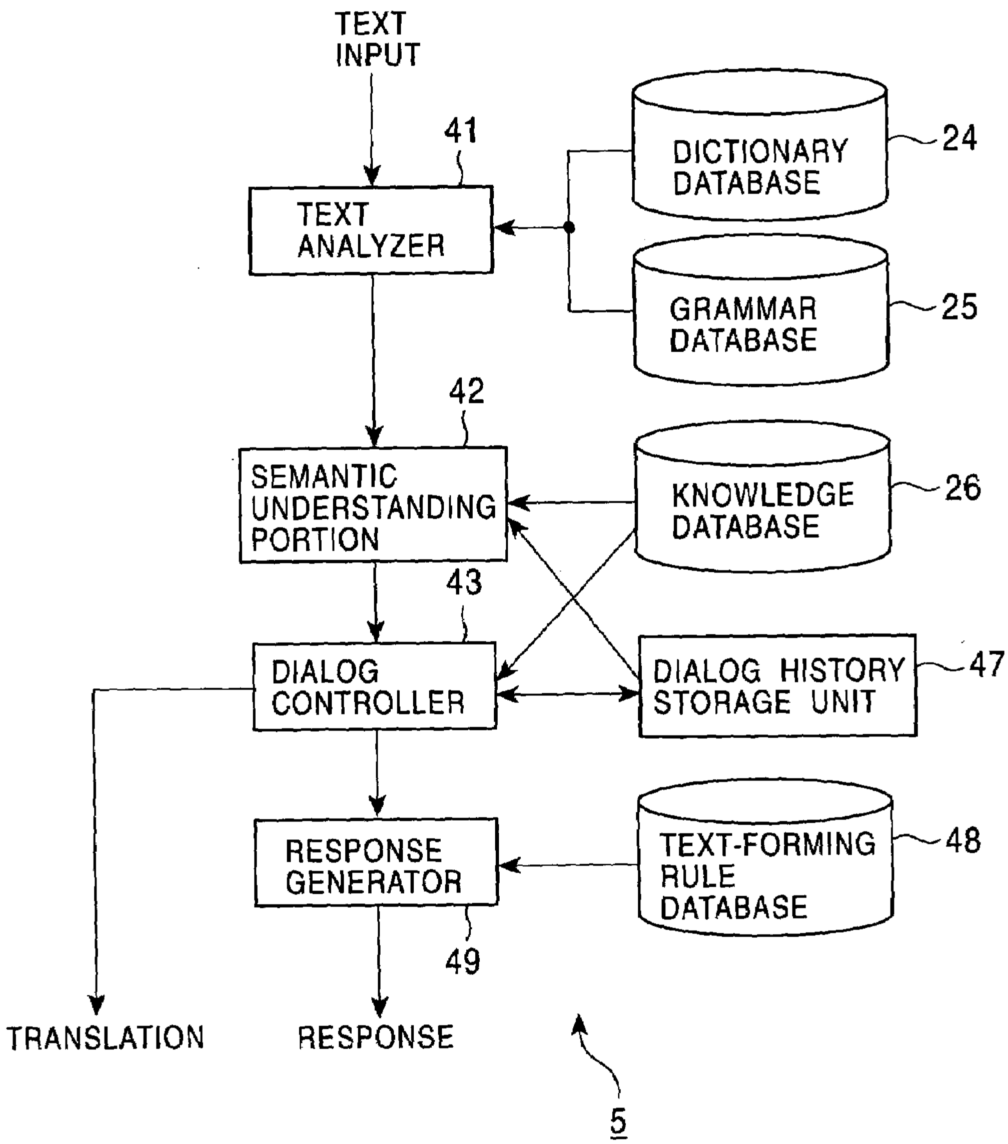
FIG. 5 is a block diagram showing a first example of the dialog management unit 5 shown in FIG. 1.

Referring to FIG. 5, a first example of the dialog management unit 5 is shown.

The text as the translation output by the machine translation unit 2, and accompanying information are supplied to a text analyzer 41. The text analyzer 41 analyzes the syntax structure of the translation by referring to a dictionary database 44 and a grammar database 45. In the first example, the dictionary database 44 contains Japanese and English dictionaries, and the grammar database 45 contains Japanese and English grammar rules. The text analyzer 41 analyzes the translation from the machine translation unit 2 by referring to the dictionary and grammar rules corresponding to the language used in the translation.

The output from the machine translation unit 2 includes the result of the analyses obtained by the text analyzer 21 (shown in FIG. 3). When the included result of analyses can be used instead of the result of the analyses by the text analyzer 41 of the dialog management unit 5, all or part of processing by the text analyzer 41 can be omitted.

The result (the syntax structure of the translation) of the analyses by the text analyzer 41 is supplied to the semantic understanding portion 42. The semantic understanding portion 42 semantically understands the translation by analyzing, based on the syntax structure of the translation output from the text analyzer 41, the meaning of the translation by referring to a knowledge database 46 and a dialog history storage unit 47. The knowledge database 46 contains various knowledge required for semantical understanding, such as common knowledge and linguistic knowledge. The dialog history storage unit 47 contains a history of dialogs held by the speech translation system. The semantic understanding portion 42 semantically understands the translation by referring to the various knowledge and the dialog history, as required. By referring to the various knowledge and the dialog history, ambiguous meanings and incompleteness of the translation being processed are eliminated, enabling precise translation based on semantic understanding.

Methods of analyzing the meaning of the translation by the semantic understanding portion 42 include, for example, extraction of a semantic structure from the translation by analyzing the translation in accordance with analyzing rules described in a lexical functional grammar and a phrase-structure grammar which are described in a Japanese book entitled "Theory of Natural Language Grammar" written by GUNJI Takao, published by Sangyo Tosho in Japan. This method requires a dictionary describing the meaning and grammatical role of each word in addition to the above-described analyzing rules. The analyzing rules and the dictionary are included in the semantic understanding portion 42.

The result of the semantic understanding of the translation by the semantic understanding portion 42 is supplied to a dialog controller 43. From the dialog controller 47, all or part of the result of the translation text and the result of the semantic understanding is sequentially supplied and stored in the dialog history storage unit 47. Thereby, the records of the dialogs held by the speech translation system are stored as parts of the dialog history.

In the first example (of the dialog management unit 5 shown in FIG. 1) shown in FIG. 5, based on the result of semantically understanding of the translation by the semantic understanding portion 42, the dialog controller 43 retrieves information relevant to the content of the translation from the knowledge database 46 and the dialog history storage unit 47. When the dialog controller 43 has retrieved a known item relevant to the translation, it uses the retrieved item to generate semantic information and additional information for generating a text responsive to the translation output from the machine translation unit 2, and supplies the types of information to a response generator 49. The response generator 49 generates, in the input language, the responsive text by referring to, for example, text-forming grammar rules, such as word-conjugation rules and word-order restrictions, stored in a text-forming rule database 48, and using the information supplied from the dialog controller 43. The generated responsive text is output to the speech synthesizing unit 3.

Accordingly, in this case, the result of the translation of the input speech is not output, but the responsive text to the input speech, generated by the dialog management unit 5, is output in the form of synthesized speech.

On the other hand, as a result of retrieving the relevant information, when the dialog controller 43 has failed to retrieve the known item relevant to the translation, it outputs the translation text and accompanying information to the speech synthesizing unit 3.

Accordingly, in this case, synthesized speech corresponding to the result of the translation of the input speech is output.

Figure 6:
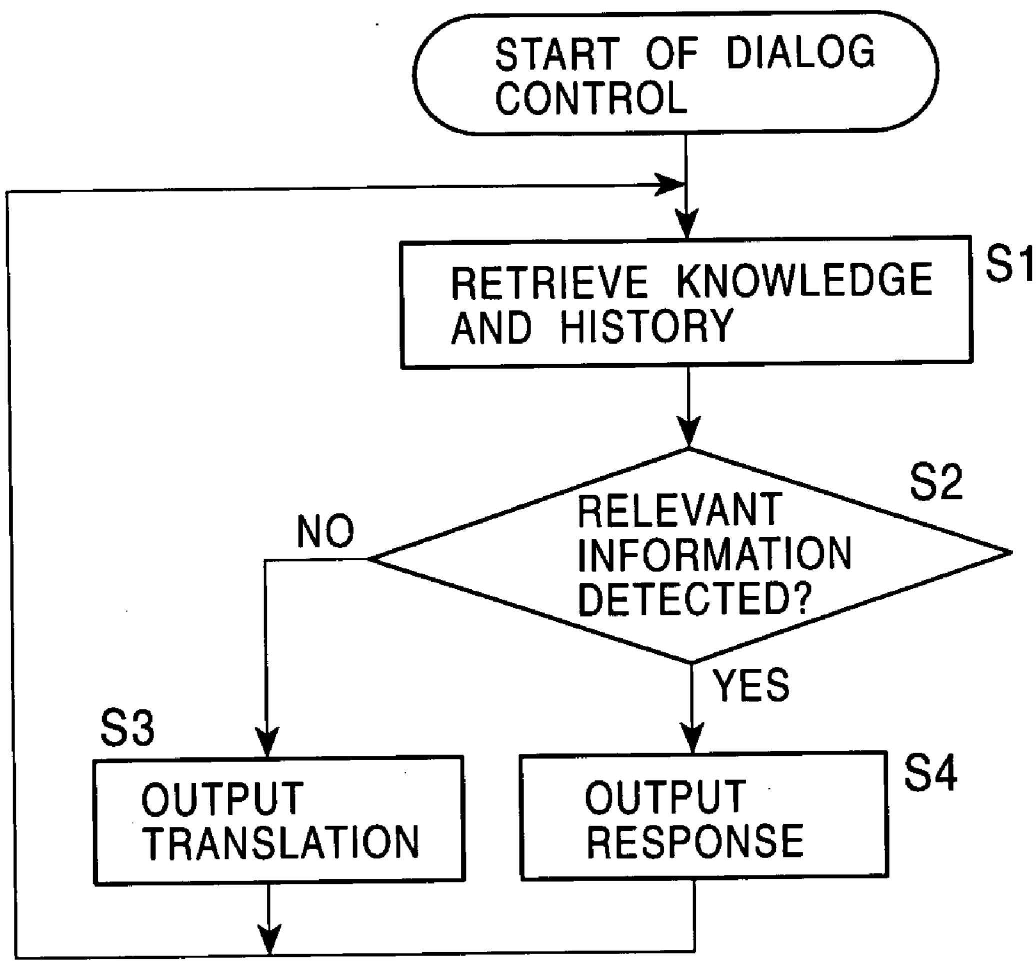
FIG. 6 is a flowchart illustrating a process performed by the dialog controller 43 shown in FIG. 5.

Referring to the flowchart shown in FIG. 6, a process performed in the dialog controller 43 (shown in FIG. 5) is described below.

When the dialog controller 43 receives the result of semantically understanding the translation from the semantic understanding portion 42, it supplies and stores the translation text and the result of the semantic understanding as part of the dialog history in the dialog history storage unit 47.

In step S1, based on the result of the semantic understanding by the semantic understanding portion 42, information relevant to the translation is retrieved from the knowledge database 46 and the dialog history storage unit 47, and the process proceeds to step S2.

In step S2, the dialog controller 43 determines whether the relevant information has been retrieved. In step S2, if the dialog controller 43 has determined that no information relevant to the translation has been retrieved, the process proceeds to step S3.

In step S3, the dialog controller 43 outputs the translation text and the accompanying information to the speech synthesizing unit 3.

The process proceeds back to step S1. The dialog controller 43 awaits the result of semantically understanding the next translation, and the same steps are repeatedly performed.

In step S2, if the dialog controller 43 has determined that the information relevant to the translation has been retrieved, the process proceeds to step S4.

In step S4, the dialog controller 43 uses the retrieved information to generate semantic information and additional information for generating a response to the translation output from the machine translation unit 2. The dialog controller 43 also outputs the information to the response generator 49.

The process proceeds back to step S1. The dialog controller 43 awaits the result of semantically understanding the next translation, and the same steps are repeatedly performed.

According to the above-described process, by reducing the number of times each user speaks, the burden on each user can be diminished.

By way of example, it is assumed that the speech translation system includes a clock, and it is assumed that the knowledge database 46 contains knowledge that the present time can be obtained by referring to the clock. In this case, if the Japanese-speaking user speaks, "Ima nan-ji? ", and the machine translation unit 2 obtains the result of translating the speech, "What time is it now?", the dialog controller 5 understands that the translation "What time is it now?" asks for the present time. Based on the result of the semantic understanding of the translation "What time is it now?", the dialog controller 43 retrieves the knowledge that the present time can be obtained by referring to the clock, which is stored in the knowledge database 46. Based on the retrieval result, the present time is acquired from the clock included in the speech translation system.

When the present time acquired as described above is, for example, 3:00 p.m., the dialog controller 43 supplies the response generator 49 with information for generating, for example, a sentence, "Gogo san-ji desu", in a language identical to that of the speech, which is a response to the speech, "Ima nannji?", by the Japanese-speaking user. The supplied information controls the response generator 49 to generate and supply a response, "Gogo san-ji desu", to the speech synthesizing unit 3. The speech synthesizing unit 3 generates and outputs synthesized speech representing the response, "Gogo san-ji desu".

Also, by way of example, it is assumed that the dialog history storage unit 47 stores a name of "John" as the name of the English-speaking user. In this case, if the Japanese-speaking user speaks, "Anata-no namae-wa nan-desuka? ", and the machine translation unit 2 obtains the sentence, "What is your name?", as the result of translation, the semantic understanding portion 42 in the dialog management unit 5 understands that the translation, "What is your name?", asks for the name of the English-speaking user. Based on the result of the semantic understanding of the translation, "What is your name?", the dialog controller 43 retrieves the English-speaking user's name "John" stored in the dialog history storage unit 47, as information relevant to the content of the translation.

The dialog controller 43 supplies the response generator 49 with information for generating, as a response, the sentence, "What is your name?", in a language identical to that of the speech "Anata-no namae-wa nan-desuka?" by the Japanese-speaking user. The supplied information controls the response generator 49 to generate and supply the response "John desu" to the speech synthesizing unit 3. The speech synthesizing unit 3 generates and outputs the synthesized speech "John desu".

As described above, by referring to the knowledge database 46 and the dialog history storage unit 47, the speech translation system generates and outputs a response to a question about an item recognized by the speech translation system without outputting a translation of the question, awaiting a response to the translated question, and outputting a translation of the response. Therefore, by reducing the number of times each user speaks, the burden on each user can be diminished.

Figure 7:
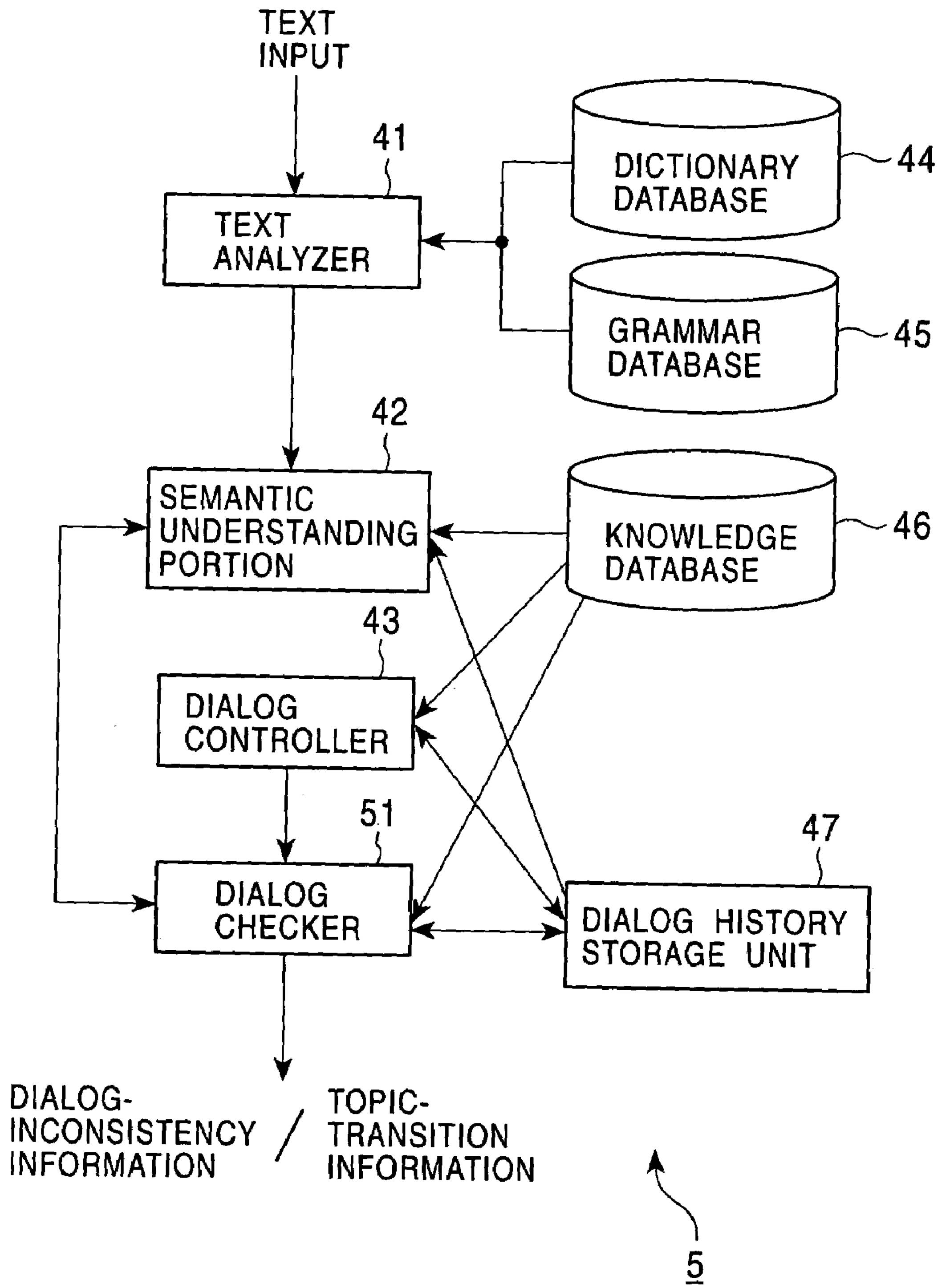
FIG. 7 is a block diagram showing a second example of the dialog management unit 5 shown in FIG. 1.

Next, referring to FIG. 7, a second example of the dialog management unit 5 is shown. In FIG. 7, blocks corresponding to those shown in FIG. 5 are denoted by identical reference numerals, and a description of each block is omitted, as required.

The second example of the dialog management unit 5 is basically similar in structure to the first example of the dialog management unit 5 (shown in FIG. 5), except that the text-forming rule database 48 and the response generator 49 (shown in FIG. 5) are not provided but a dialog checker 51 is provided.

In the second example shown in FIG. 7 (and also in an example shown in FIG. 9), a dialog controller 43 sequentially supplies and stores the translation text and the result of the semantic meaning of the text in a dialog history storage unit 47, whereby only the process of storing a history of dialogs held by the speech translation system is performed.

The result of semantic understanding of the translation, obtained by the a semantic understanding portion 42, is supplied to the dialog checker 51. Based on the supplied result of semantic understanding, the dialog checker 51 retrieves information relevant to the content of the translation from a knowledge database 46 and the dialog history storage unit 47. As a result of the retrieval, the dialog controller 43 checks that the translation is unnatural compared with the flow of the present dialog and that the topic of a dialog has been changed. The dialog controller 43 outputs, to the matching portion 15 (shown in FIG. 2) in the speech recognition unit 1 and the language converter 22 (shown in FIG. 3) in the machine translation unit 2, as dialog-management information, dialog-inconsistency information when the translation is unnatural, and topic-transition information when the dialog topic has been changed.

Figure 8:
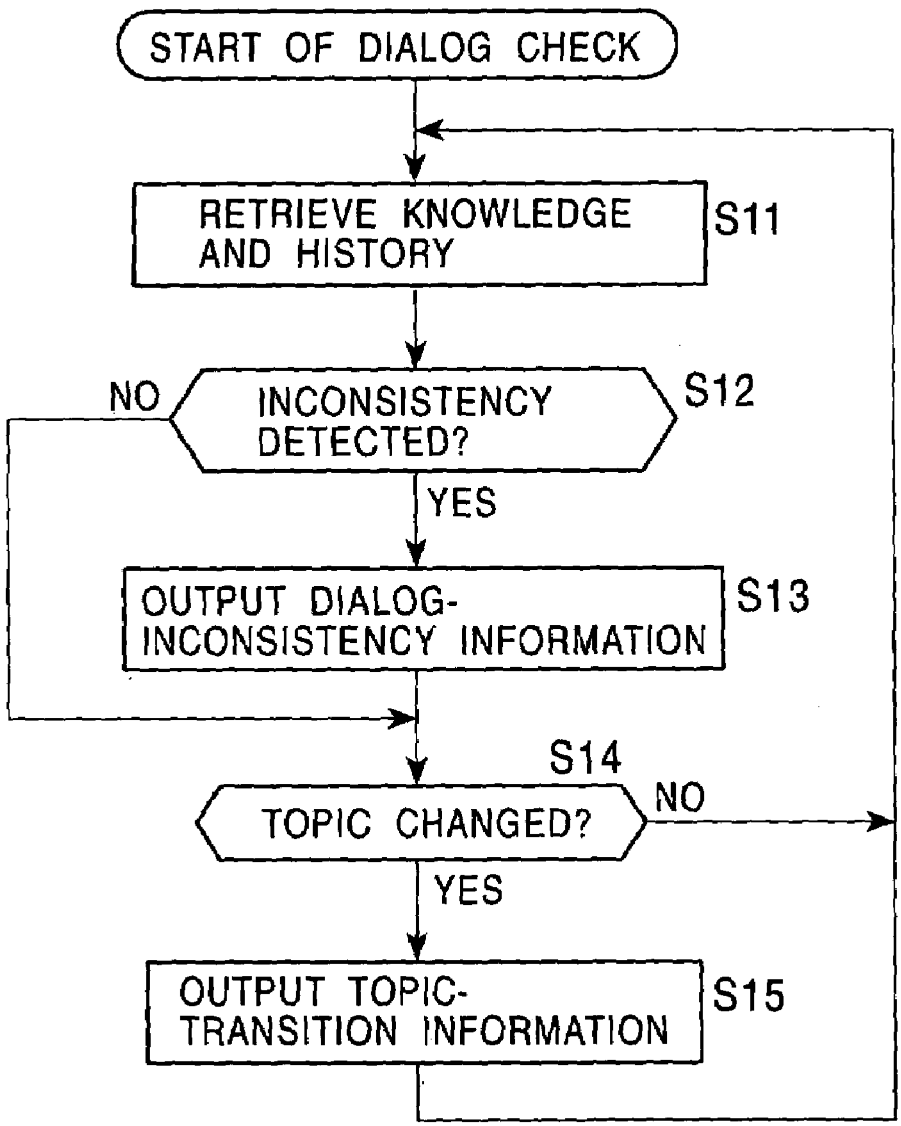
FIG. 8 is a flowchart illustrating a process performed by the dialog checker 51 shown in FIG. 7.

Next, referring to the flowchart shown in FIG. 8, a process performed by the dialog checker 51 shown in FIG. 7 is further described below.

In step S11, when receiving the result of the semantic understanding of the translation from the semantic understanding portion 42, the dialog checker 51 retrieves, based on the received result, information relevant to the content of the translation from the knowledge database 46 and the dialog history storage unit 47. The process proceeds to step S12.

In step S12, the dialog checker 51 determines based on the retrieval result whether the translation is unnatural compared with the flow of the topic. If the dialog checker 51 has determined that the translation is natural, the process proceeds to step S14, skipping over step S13. In step S12, if the dialog checker 51 has determined that the translation is unnatural, the process proceeds to step S13.

In step S13, dialog-inconsistency information representing the determination is supplied to the matching portion 15 (shown in FIG. 2) in the speech recognition unit 1 and the language converter 22 (shown in FIG. 3) in the machine translation unit 2, and the process proceeds to step S14.

In step S14, the dialog checker 51 determines based on the retrieval result obtained in step S11 whether the dialog topic has been changed. If the dialog checker 51 has determined that the dialog topic has not been changed, the process proceeds back to step S1, skipping over step S15, and awaits the result of the semantic understanding of the next translation. Subsequently, the same steps are repeatedly performed.

In step S14, if the dialog checker 51 has determined that the dialog topic has been changed, the process proceeds to step S15.

In step S15, the dialog checker 51 outputs topic-transition information representing the determination to the matching portion 15 (shown in FIG. 2) in the speech recognition unit 1 and the language converter 22 (shown in FIG. 3) in the machine translation unit 2. The process proceeds back to step S11, and awaits the result of the semantic understanding of the next translation. Subsequently, the same steps are repeatedly performed.

According to the above-described process, precision of speech recognition in the speech translation system and precision of machine translation can be increased.

By way of example, assuming that the machine translation unit 2 obtains a translation, "ash", corresponding to a speech in Japanese, "Hai", the translation, "ash", is supplied to the dialog checker 51 via the text analyzer 41 and the semantic understanding portion 42. By referring to the knowledge database 46 and the dialog history storage unit 47, the dialog checker 51 determines whether the translation, "ash", corresponding to the Japanese speech, "Hai", is unnatural compared with the flow of the dialog.

At this time, if the dialog history stored in the dialog history storage unit 47 includes the fact that the last speech in English is "Are you fine?", it is natural to use "Yes" or "No" as a response to such a simple question of "Are you fine?" (on the assumption that this type of knowledge is stored in the knowledge database 46). Accordingly, the dialog checker 51 determines that the translation, "ash", is unnatural compared with the flow of the dialog. The dialog checker 51 outputs the dialog-inconsistency information as dialog management information to the matching portion 15 (shown in FIG. 2) in the speech recognition unit 1 and the language converter 22 (shown in FIG. 3) in the machine translation unit 2.

When receiving the dialog-inconsistency information, the matching portion 15 (shown in FIG. 2) in the speech recognition unit 1 regards the last output result of speech recognition as erroneous, and outputs, for the last input speech, options to be used as the result of speech recognition. When receiving the dialog-inconsistency information, also the language converter 22 (shown in FIG. 3) in the machine translation unit 2 regards the last output result of speech recognition as erroneous, and outputs, for the last input speech, options to be used as the result of speech recognition. The other options are processed again by the dialog checker 51. As a result, the speech synthesizing unit 3 finally outputs a natural translation (translation which is not unnatural) compared with the flow of the dialog.

Accordingly, in the above-described case, precision of the translation output from the speech translation system can be increased.

In the above-described case, the dialog-inconsistency information supplied from the dialog checker 51 to the matching portion 15 in the speech recognition unit 1 and the language converter 22 in the machine translation unit 2 can include information representing a high possibility that a speech using "Yes" or "No" as a response to the simple question, and the matching portion 15 and the language converter 22 can be controlled to perform processing considering the information.

In addition, by way of example, the dialog checker 51 finds words included in the translation and a distribution of recently used words (particularly nouns) stored in the dialog history storage unit 47 by referring to the knowledge database 46 and the dialog history storage unit 47, and determines whether the distribution is biased to words for use in a particular field (e.g., medicine, etc.). When the distribution of recently used words is biased in the particular field, the dialog checker 51 recognizes a transition of the dialog topic to the particular field, and outputs topic-transition information as dialog management information to the matching portion 15 (shown in FIG. 2) in the speech recognition unit 1 and the language converter 22 (shown in FIG. 3) in the machine translation unit 2.

In general, when a particular word is repeatedly spoken, a transition of the dialog topic with the word as a key is presumed.

When receiving the topic-transition information, the matching portion 15 in the speech recognition unit 1 performs speech recognition in which a topic-related vocabulary included in the topic-transition information is particularly weighted (or a dictionary containing such a vocabulary is particularly used). Also the language converter 22 in the machine translation unit 2 performs machine translation in which parameters about the topic-related vocabulary included in the topic-transition information are particularly weighted.

Accordingly, in this case, precision of speech recognition by the speech recognition unit 1 and precision of translation by the machine translation unit 2 can be increased.

The topic-transition information may include not only a particular field in the dialog (or frequently used words in the particular field) but also, for example, quantitative information such as a biased distribution of words found by the dialog checker 51.

Figure 9:
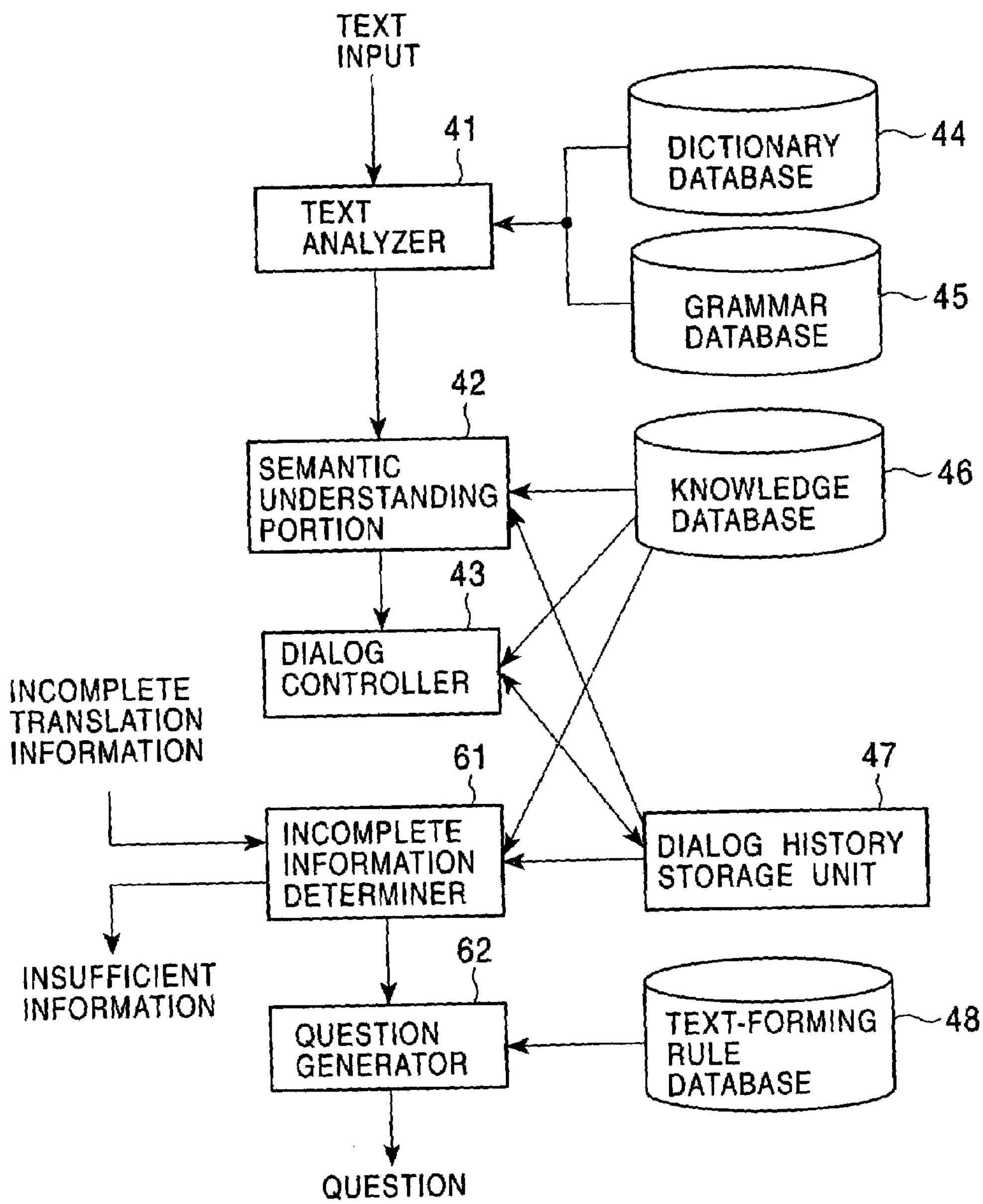
FIG. 9 is a block diagram showing a third example of the dialog management unit 5 shown in FIG. 1.

Next, referring to FIG. 9, a third example of the dialog management unit 5 shown in FIG. 1 is described below. In FIG. 9, blocks corresponding to those shown in FIG. 5 are denoted by identical reference numerals, and a description of each block is omitted, as required.

The third example shown in FIG. 9 is basically similar to in structure to the first example of the dialog management unit 5, except that an incomplete information determiner 61 and a question generator 62 are newly provided.

The incomplete translation information, output by the language converter 22 (shown in FIG. 3) in the machine translation unit 2, is supplied to the incomplete information determiner 61. When receiving the incomplete translation information, the incomplete information determiner 61 retrieves information required for translation from a knowledge database 46 and a dialog history storage unit 47.

When the language converter 22 receives information that cannot be translated in a translating process, it interrupts the process, causes the incompletely processed information to be included in the incomplete translation information, and supplies the incomplete translation information to the incomplete information determiner 61. Based on the supplied incomplete translation information, the incomplete information determiner 61 specifies an unsuccessfully translated portion and the cause of the unsuccessful translation, and retrieves insufficient information for translation, which is required for eliminating the cause, by referring to the knowledge database 46 and the dialog history storage unit 47.

When obtaining the insufficient information, the incomplete information determiner 61 supplies it as dialog management information to the language converter 22 (shown in FIG. 3) in the machine translation unit 2. In this case, the language converter 22 uses the insufficient information supplied from the incomplete information determiner 61 to restart processing.

When not obtaining the insufficient information, the incomplete information determiner 61 requests the question generator 62 to generate a question for obtaining the insufficient information. In accordance with the request from the incomplete information determiner 62, the question generator 62 generates, in a language of the unsuccessfully translated speech, a question for asking the user to answer the insufficient information by referring to the text-forming rule database 48, and outputs the generated question to the speech synthesizing unit 3. Accordingly, from the speech synthesizing unit 3, synthesized speech corresponding to the question is generated and output.

When the user speaks a response to the question output in the form of the synthesized speech from the speech synthesizing unit 3, the spoken response is recognized by the speech recognition unit 1 and is supplied to the machine translation unit 2. The machine translation unit 2 adds the result of speech recognition to the last result of speech recognition, and restarts processing.

Figure 10:
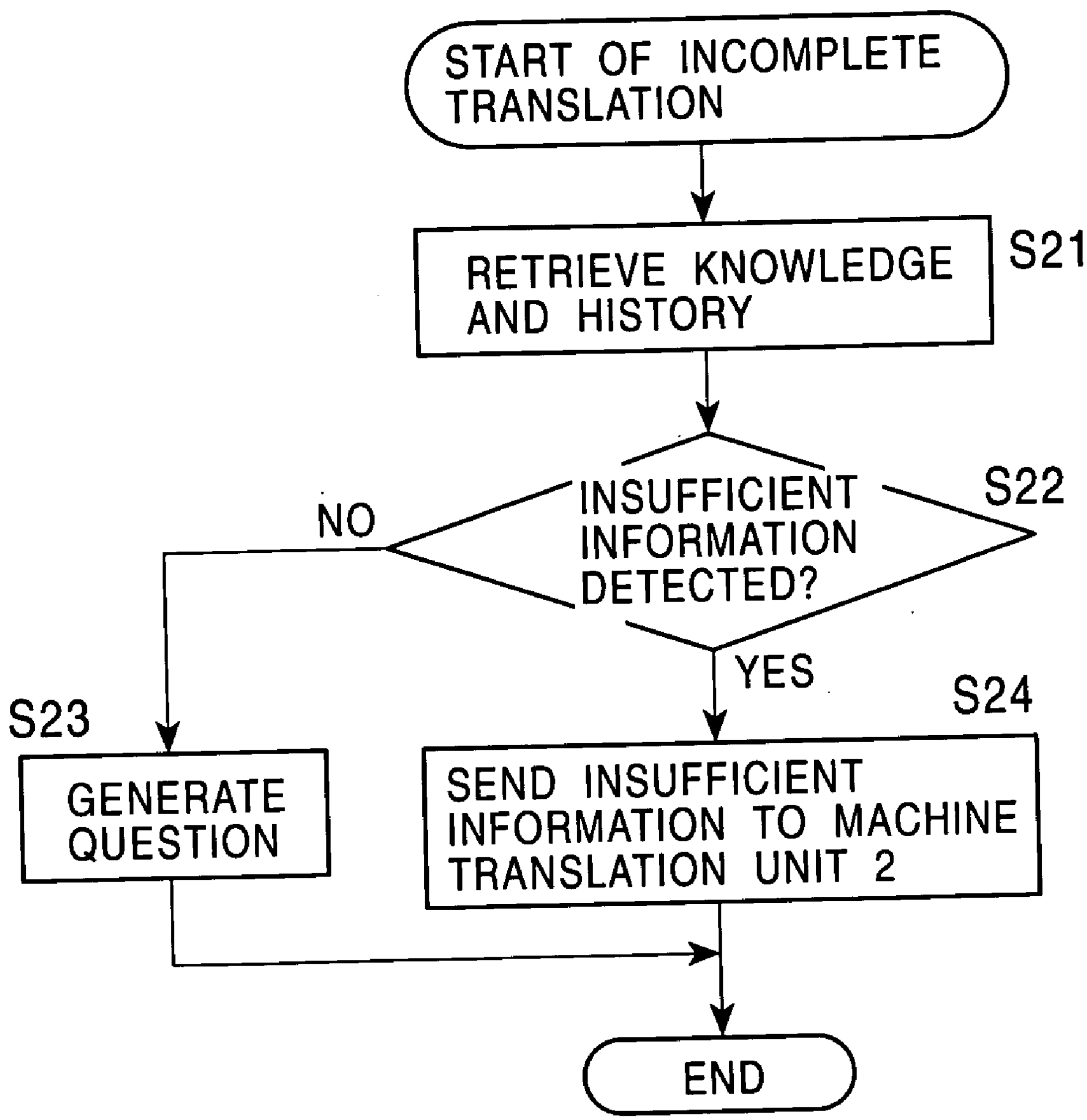
FIG. 10 is a flowchart illustrating a process performed by the incomplete information determiner 61 shown in FIG. 9.

Next, referring to the flowchart shown in FIG. 10, the process performed by the incomplete information determiner 61 shown in FIG. 9 is further described below.

In step S21, when the incomplete information determiner 61 receives the incomplete translation information from the language converter 22 (shown in FIG. 3) in the machine translation unit 2, it specifies, based on the incomplete translation information, an unsuccessfully translated portion and the cause of the unsuccessful translation, and retrieves insufficient information for translation, which is required for eliminating the unsuccessful translation cause, by referring to the knowledge database 46 and the dialog history storage unit 47. The process proceeds to step S22.

In step S22, the incomplete information determiner 61 determines whether the insufficient information has been obtained. If the incomplete information determiner 61 has determined in step S22 that the insufficient information has not been obtained, the process proceeds to step S23.

In step S23, the incomplete information determiner 61 requests the question generator 62 to generate a question for obtaining the insufficient information, and terminates the process. In this case, the question generator 62 generates and outputs the question via the speech synthesizing unit 3.

If the incomplete information determiner 61 has determined in step S22 that the insufficient information has been obtained, the process proceeds to step S24.

In step S24, the incomplete information determiner 61 outputs the insufficient information as dialog management information to the language converter 22 (shown in FIG. 3) in the machine translation unit 2, and terminates the process.

The above-described process enables precise translation by the machine translation unit 2.

By way of example, assuming that the result of speech recognition of speech by the Japanese-speaking user, "Watashite-kudasai", is supplied to the machine translation unit 2, the machine translation unit 2 determines an English translation of the speech ("Watashite-kudasai"), which uses "hand" as a verb and the pronoun "it" as an object which is not unnatural. However, the original Japanese speech, "Watashite-kudasai", lacks information on an object representing a receiver. Accordingly, the machine translation unit 2 cannot generate a complete English translation of the original Japanese speech, "Watashite-kudasai", and terminates the translation process.

In the case where, when Japanese is translated into English, an English translation cannot be generated due to lack of a subject or an object, etc., and the translation process is interrupted, as described above, the machine translation unit 2, specifically the language converter 22, outputs, to the incomplete information determiner 61, in-process information, namely, incomplete translation information including the fact that an object to the verb "hand" cannot be determined.

When receiving the incomplete translation information, the incomplete information determiner 61 understands, based on the incomplete translation information, what type of problem has occurred in the translation process performed by the machine translation unit 2, and determines, by referring to the knowledge database 46 and the dialog history storage unit 47, whether the problem can be solved, in other words, whether a problem of lack of an object to the verb "hand" can be solved.

Specifically, for example, when the dialog history storage unit 47 contains a recent speech record of handing something to a male, the incomplete information determiner 61 presumes that the object to the verb "hand" is "him" representing the male. This causes the incomplete information determiner 61 to determine that the problem occurring in the translation process can be solved. in accordance with this determination, the incomplete information determiner 61 outputs, to the machine translation unit 2, as dialog management information, insufficient information in which the object to the verb "hand" is "him". The machine translation unit 2 uses the dialog management information to restart the translation process.

If the incomplete information determiner 61 has determined that the problem occurring in the translation process by the machine translation unit 2 cannot be solved because the above-described presumption is impossible, the incomplete information determiner 61 controls the question generator 62 to generate a question for obtaining the object to the verb "hand" from the user.

The question generator 62 generates a question for obtaining the object to the verb "hand" from the user, such as "Mokutekigo-wa nan-desuka? (What is an object?)". As the question, for example, "Mokutekigo-wa kare-desuka, kanojo-desuka? (Is the object him or her?)", or "Dare-ni taishite sosuru-nodesuka? (To whom will you do?)", can be used. The question generator 62 can select from question patterns, as required.

The question generated by the question generator 62 is supplied to the speech synthesizing unit 3, where it is output in the form of synthesized speech. For example, when the Japanese-speaking user speaks, "John desu" in response to synthesized speech corresponding to the question, "Mokutekigo-wa nan-desuka? (What is an object?)", the speech is recognized by the speech recognition unit 1, and the result of speech recognition is supplied to the machine translation unit 2. The machine translation unit 2 adds "John" as the result of speech recognition to the last result of speech recognition, and restarts the translation process. In other words, the added result of speech recognition solves the problem of the lack of the object to the verb "hand" ("John" is recognized as the object). Accordingly, the interrupted translation process is restarted and the translation, "hand it to John" is generated.

As described above, even when only the result of speech recognition by the speech recognition unit 1 cannot make it possible to perform complete translation, a translation process can be performed by obtaining insufficient information, referring to the knowledge in the dialog management unit 5 and the history of dialogs. When the insufficient information cannot be obtained by even referring to the knowledge in the dialog management unit 5 and the history of dialogs, the translation process can be performed by outputting a question for obtaining the insufficient information, and obtaining the insufficient information through a user's response to the question.

The above-described consecutive processes can be performed by hardware or by software. When the above-described consecutive processes are performed by software, programs constituting the software are installed in a computer built into a speech translation system as dedicated hardware, or in a multipurpose computer, etc.

Accordingly, a recording medium containing the programs, which is used to install the programs in a computer and to set them to be executable, is described below, referring to FIGS. 11A, 11B, and 11C.

Figure 11A:
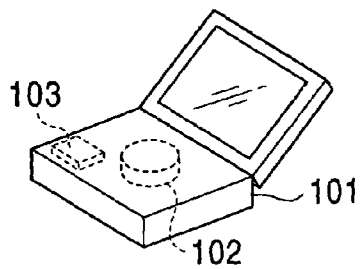
FIGS. 11A, 11B, and 11C are illustrations of recording media to which the present invention is applied.

Each program can be recorded in a hard disk 102 or a semiconductor memory 103 as a recording medium built into a computer 101, as shown in FIG. 11A.

Figure 11B:
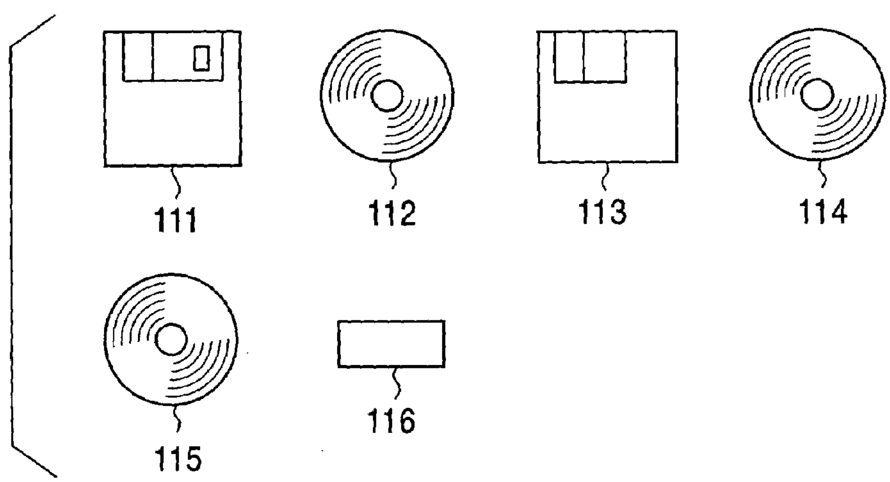
Figure 11C:
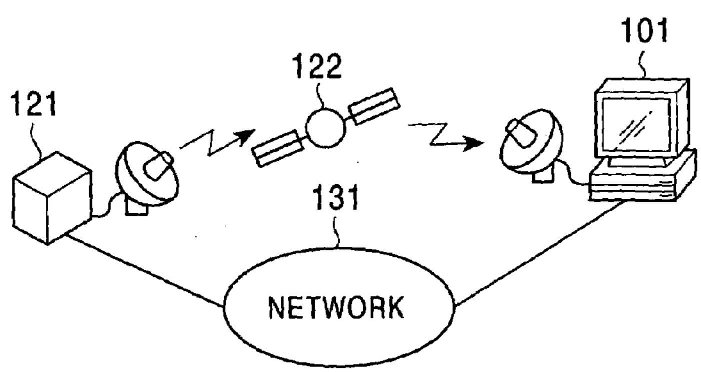

In addition, each program can be temporarily or permanently stored (recorded) in a recording medium such as a floppy disk 111, a compact-disk read-only memory (CD-ROM) 112, a magneto-optical (MO) disk 113, a digital versatile disk (DVD) 114, a magnetic disk 115, or a semiconductor memory 116, as shown in FIG. 11B. This type of recording medium can be provided as so-called "package software".

Moreover, in addition to downloading from the above-described recording medium to the computer, by transferring each program from a download site 121 to the computer 101 by radio via a satellite 122 for digital broadcasting, or by transferring each program to the computer 101 by wire via a network such as a local area network or the Internet, each program can be installed in the hard disk 102 of the computer 101.

In this Specification, processing steps that describe each program for controlling the computer 101 to perform various processing do not always need to be time-sequentially executed in the order indicated by a flowchart, and include processes to be executed in parallel or separately (e.g., parallel processes or object-based processes).

The programs may be executed by a computer or may be distributively executed by a plurality of computers. The programs may be transferred so as to be executed in a remote computer.

Next, referring to FIG. 12, the structure of the computer 101 shown in FIG. 11 is described below.

Figure 12:
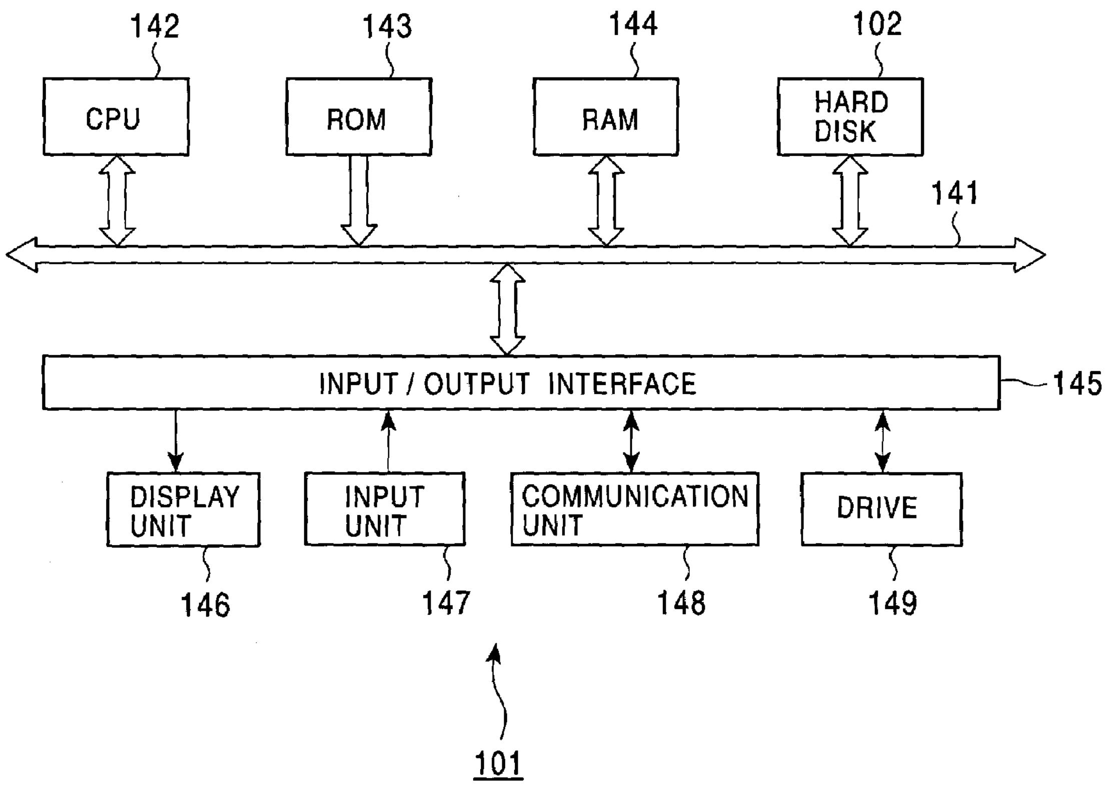
FIG. 12 is a block diagram showing an example of the computer 101 shown in FIG. 11.

The computer 101 has a built-in central processing unit (CPU) 142, as shown in FIG. 12. An input/output interface 145 is connected to the CPU 142. When a user inputs a command via the input/output interface 145 by operating an input unit 147 such as a keyboard or a mouse, the CPU 142 executes each program stored a read-only memory (ROM) 143 corresponding to the semiconductor memory 103 shown in FIG. 11A. Also, the CPU 142 loads and executes each program stored in the hard disk 102, each program installed in the hard disk 102 after being transferred from the satellite 122 or the network 131 and being received by a communication unit 148, or each program installed in the hard disk 102 after being read from one medium among the floppy disk 111, the CD-ROM 112, the MO disk 113, the DVD 114, and the magnetic disk 115, which are loaded into a drive 149. The CPU 142 outputs the result of processing to a display unit 146 such as a liquid crystal display via, for example, the input/output interface 145, as required.

In the foregoing embodiment, mutual translation between Japanese and English has been described. However, the present invention may be applied to translation between other different languages.

Although, in the foregoing embodiment, the speech recognition unit 1 recognizes speech and the machine translation unit 2 translates the result of speech recognition, the machine translation unit 2 may translate not only the speech but also, for example, a text input from a keyboard, and a text obtained from recognition of handwritten characters, etc., by a character recognition apparatus.

Although, in the foregoing embodiment, the result of translation is output in the form of synthesized speech, it may be displayed in the form of a text.

What is claimed is:

1. A translating apparatus for translating a text input in a first language and outputting a text translated in a second language and for translating a text input in said second language and outputting a text translated in said first language, said translating apparatus comprising:

translator means for translating said first language into said second language and for translating said second language into said first language;

history storage means for storing a history of dialogs in said first language and said second language;

knowledge storage means for storing predetermined knowledge; and processing means for performing predetermined processing based on the dialog history and the predetermined knowledge, wherein said processing means generates a response to the input text without outputting a translation of the input text.

2. A translating apparatus for translating a text input in a first language and outputting a text translated in a second language and for translating a text input in said second language and outputting a text translated in said first language, said translating apparatus comprising:

translator means for translating said first language into said second language and for translating said second language into said first language;

history storage means for storing a history of dialogs in said first language and said second language;

knowledge storage means for storing predetermined knowledge; and processing means for performing predetermined processing based on the dialog history and the predetermined knowledge, wherein said processing means checks the result of translation by said translator means, and supplies the result of the checking to said translator means; and said translator means performs translation based on the information from said processing means.

3. A translating apparatus for translating a text input in a first language and outputting a text translated in a second language and for translating a text input in said second language and outputting a text translated in said first language, said translating apparatus comprising:

translator means for translating said first language into said second language and for translating said second language into said first language;

history storage means for storing a history of dialogs in said first language and said second language;

knowledge storage means for storing predetermined knowledge; and processing means for performing predetermined processing based on the dialog history and the predetermined knowledge, wherein said processing means detects a transition of the topic of a dialog, and supplies the result of the detection to said translator means; and said translator means performs translation based on the information from said processing means.

4. A translating apparatus for translating a text input in a first language and outputting a text translated in a second language and for translating a text input in said second language and outputting a text translated in said first language, said translating apparatus comprising:

translator means for translating said first language into said second language and for translating said second language into said first language;

history storage means for storing a history of dialogs in said first language and said second language;

knowledge storage means for storing predetermined knowledge; and processing means for performing predetermined processing based on the dialog history and the predetermined knowledge, wherein said processing means acquires information required for the translation, and supplies the acquired information to said translator means, or requests a user of said translating apparatus to input the required information when the required information cannot be acquired and supplies the required information to said translator means.

5. A method for translating a text input in a first language and outputting a text translated in a second language and for translating a text input in said second language and outputting a text translated in said first language, said method comprising the steps of:

translating said first language into said second language and translating said second language into said first language using a translating means;

storing a history of dialogs in said first language and said second language;

storing predetermined knowledge; and performing predetermined processing based on the dialog history and the predetermined knowledge using a processing means, wherein a response to the input text is generated by the processing means without outputting a translation of the input text.

6. A method for translating a text input in a first language and outputting a text translated in a second language and for translating a text input in said second language and outputting a text translated in said first language, said method comprising the steps of:

translating said first language into said second language and translating said second language into said first language using a translating means;

storing a history of dialogs in said first language and said second language;

storing predetermined knowledge; and performing predetermined processing based on the dialog history and the predetermined knowledge using a processing means, wherein the result of translation is checked by the processing means, and the result of the checking is supplied to the translating means by said processing means; and said translating is performed by said translating means based on the information from said processing means.

7. A method for translating a text input in a first language and outputting a text translated in a second language and for translating a text input in said second language and outputting a text translated in said first language, said method comprising the steps of:

translating said first language into said second language and translating said second language into said first language using a translating means;

storing a history of dialogs in said first language and said second language;

storing predetermined knowledge; and performing predetermined processing based on the dialog history and the predetermined knowledge using a processing means, wherein a transition of the topic of a dialog is detected by said processing means, and the result of the detection is supplied to said translating means by said processing means; and said translating is performed by said translating means based on the information from said processing means.

8. A method for translating a text input in a first language and outputting a text translated in a second language and for translating a text input in said second language and outputting a text translated in said first language, said method comprising the steps of:

translating said first language into said second language and translating said second language into said first language using a translating means;

storing a history of dialogs in said first language and said second language;

storing predetermined knowledge; and performing predetermined processing based on the dialog history and the predetermined knowledge using a processing means, wherein information required for the translation is acquired by said processing means and the acquired information is supplied to the translating means by said processing means, or a user is requested to input the required information when the required information cannot be acquired and the required information is supplied to the translating means by said processing means.

* * * * *